(12) United States Patent
Larocque

(10) Patent No.: US 7,921,695 B2
(45) Date of Patent: Apr. 12, 2011

(54) METHOD AND APPARATUS FOR MEASURING MEDIUM LAYERS AND INTERFACES BETWEEN THEM USING A MULTI-SENSOR PROBE

(75) Inventor: Jean-René Larocque, Peterborough (CA)

(73) Assignee: Siemens Milltronics Process Instruments, Inc., Peterborough, ON (CA)

( * ) Notice: Subject to any disclaimer, the term of this patent is extended or adjusted under 35 U.S.C. 154(b) by 462 days.

(21) Appl. No.: 12/218,719

(22) Filed: Jul. 17, 2008

(65) Prior Publication Data
US 2009/0019930 A1 Jan. 22, 2009

(30) Foreign Application Priority Data
Jul. 19, 2007 (EP) .................................. 07014224

(51) Int. Cl.
*G01N 37/00* (2006.01)
(52) U.S. Cl. ..................................... 73/61.44; 73/304 C
(58) Field of Classification Search ................ 73/304 C, 73/304 R, 53.01, 54.12, 61.44, 61.41
See application file for complete search history.

(56) References Cited

U.S. PATENT DOCUMENTS

| | | | |
|---|---|---|---|
| 4,611,489 A | 9/1986 | Spaargaren et al. |
| 6,101,873 A | 8/2000 | Kawakatsu et al. |
| 6,761,067 B1 | 7/2004 | Capano |

FOREIGN PATENT DOCUMENTS

WO WO 2007/006788 A1 1/2007

OTHER PUBLICATIONS

Christophe Andrieu and Arnaud Doucet; "Joint Bayesian Model Selection and Estimation of Noisy Sinusoids via Reversible Jump MCMC"; IEEE Transactions on Signal Processing, vol. 47, No. 10, Oct. 1999; pp. 2667-2676.
Jean-René Larocque, James P. Reilly, William Ng; "Particle Filters for Tracking an Unknown Number of Sources"; IEEE Transactions on Signal Processing, vol. 50, No. 12, Dec. 2002; pp. 2926-2937.
W. Ng, J.P. Reilly, T. Kirubarajan and J.R. Larocque; "Wideband Array Signal Processing Using MCMC Methods", IEEE Transactions on Signal Processing, vol. 53, No. 2, Feb. 2005, p. 411-426.

*Primary Examiner* — Hezron Williams
*Assistant Examiner* — Rodney T Frank

(57) ABSTRACT

For measuring the filling level of a measuring medium, including detecting multiple medium layers and interfaces between them, a multi-sensor probe can be dipped into the measuring medium and longitudinally segmented into a plurality of segments, each segment comprising a sensor for measuring a predetermined physical parameter of the surrounding medium. To provide an accurate, reliable and robust measurement of multiple medium layers a measurement model is defined for modeling signals of the sensors as a function of positions of a number of interfaces between the medium layers and the physical parameters of the medium layers. Prior distributions of the number of the interfaces, the positions of the interfaces and the physical parameters of the medium layers are defined. Based on the measurement model and the prior distributions a joint posterior distribution of the number of the interfaces and the positions of the interfaces is determined. The joint posterior distribution of the number of the interfaces and the positions of the interfaces is evaluated based on Markov Chain Monte Carlo methods.

5 Claims, 3 Drawing Sheets

METHOD AND APPARATUS FOR MEASURING MEDIUM LAYERS AND INTERFACES BETWEEN THEM USING A MULTI-SENSOR PROBE

CROSS REFERENCE TO RELATED APPLICATIONS

This application claims priority of European Patent Office application No. 07014224.5 EP filed Jul. 19, 2007, which is incorporated by reference herein in its entirety.

FIELD OF INVENTION

The invention relates to a method for measuring medium layers and interfaces between them using a multi-sensor probe.

It further relates to a corresponding apparatus.

BACKGROUND OF INVENTION

For measuring the filling level of a measuring medium, such as a fluid or bulk material, in a vessel, tank, container and so on, including detecting multiple medium layers, such as water and oil, and interfaces between them, it is known to use an elongated, for example a rod-shaped, probe which extends vertically over the fillable vessel height and dips into the measuring medium. The probe is longitudinally segmented into a plurality of segments, each segment comprising a sensor for measuring a predetermined physical parameter of the surrounding medium, such as its dielectric constant, impedance, temperature, magnetic or optical properties and so on. To achieve a sufficiently high measuring resolution, the number of the segments is much higher than the expected number of medium layers or interfaces. If the sensors are comprised of individual electrodes, the parameter can be measured between each sensor electrode and a common reference electrode, e.g. the conductive vessel wall, or between the respective adjacent sensor electrodes. Furthermore, if the measurement principle does not require direct contact with the medium, such as in case of a capacitance measurement in connection with a non-metallic vessel, the probe can be located outside the medium, e.g. at the outer wall of the vessel. The individual measurings, which can be performed simultaneously or successively, are finally jointly evaluated by computing means to determine the filling level and the positions of the interfaces between the different medium layers.

Level measuring devices as described above are known from U.S. Pat. No. 4,611,489, U.S. Pat. No. 6,101,873, U.S. Pat. No. 6,761,067 and WO 2007/006788.

The measurement by each individual sensor is not only dependent on the physical parameter of the immediately surrounding layer medium but also more or less affected by the physical parameters and the properties of all other layers. In addition, neither the number nor the thickness nor the physical parameters of the medium layers are known a priori. This all makes it very difficult to properly detect multiple layers and the positions of the interfaces between them and to determine the physical parameter of each layer.

SUMMARY OF INVENTION

It is therefore an object of the invention to provide an accurate, reliable and robust measurement of multiple medium layers.

From, among others,

C. Andrieu and A. Doucet: "Joint Bayesian Model Selection and Estimation of Noisy Sinusoids via Reversible Jump MCMC", IEEE Transactions on Signal Processing, Vol. 47, No. 10, October 1999, p. 2667-2676, J. R. Larocque, W. Ng and J. P. Reilly: "Particle Filters for Tracking an Unknown Number of Sources", IEEE Transactions on Signal Processing, Vol. 50, No. 12, December 2002, p. 2926-2937, and W. Ng, J. P. Reilly, T. Kirubarajan and J. R. Larocque: "Wideband Array Signal Processing Using MCMC Methods", IEEE Transactions on Signal Processing, Vol. 53, No. 2, February 2005, p. 411-426, a method for array signal processing is known, where signals of an unknown number of sources in background noise impinge onto an array of antennas. To detect the number of sources and to estimate parameters, such as direction-of-arrival or time-of-arrival, a multi-dimensional signal model comprising the array of antennas, the signals received by the antennas, the sources and the noise is proposed. Following a Bayesian approach, the unknown parameters, the noise variance and the number of sources are regarded as random quantities with known prior distribution. Based on the model, a posterior probability distribution over the space of possible structures of the signal is defined. Since the number of sources is assumed random, the posterior distribution to be evaluated is defined on a finite disconnected union of subspaces of various dimensions. Each subspace corresponds to a model with a fixed number of sources. The posterior distribution is highly nonlinear in its parameters, thus precluding analytical calculations. Therefore, to evaluate the joint distribution of the number of sources and their parameters, a stochastic algorithm based on Markov Chain Monte Carlo (MCMC) methods is proposed.

The present invention advantageously recognizes the value of this known method for detecting multiple medium layers using a multi-sensor probe dipping into the medium, and thus provides a method as defined in an independent claim and an apparatus as defined in a further independent claim.

Preferred embodiments of the method and apparatus according to the invention are specified in the remaining claims.

BRIEF DESCRIPTION OF THE DRAWINGS

The invention will be now described by way of example and with reference to the accompanying drawing, in which.

DETAILED DESCRIPTION OF INVENTION

Figure 1:
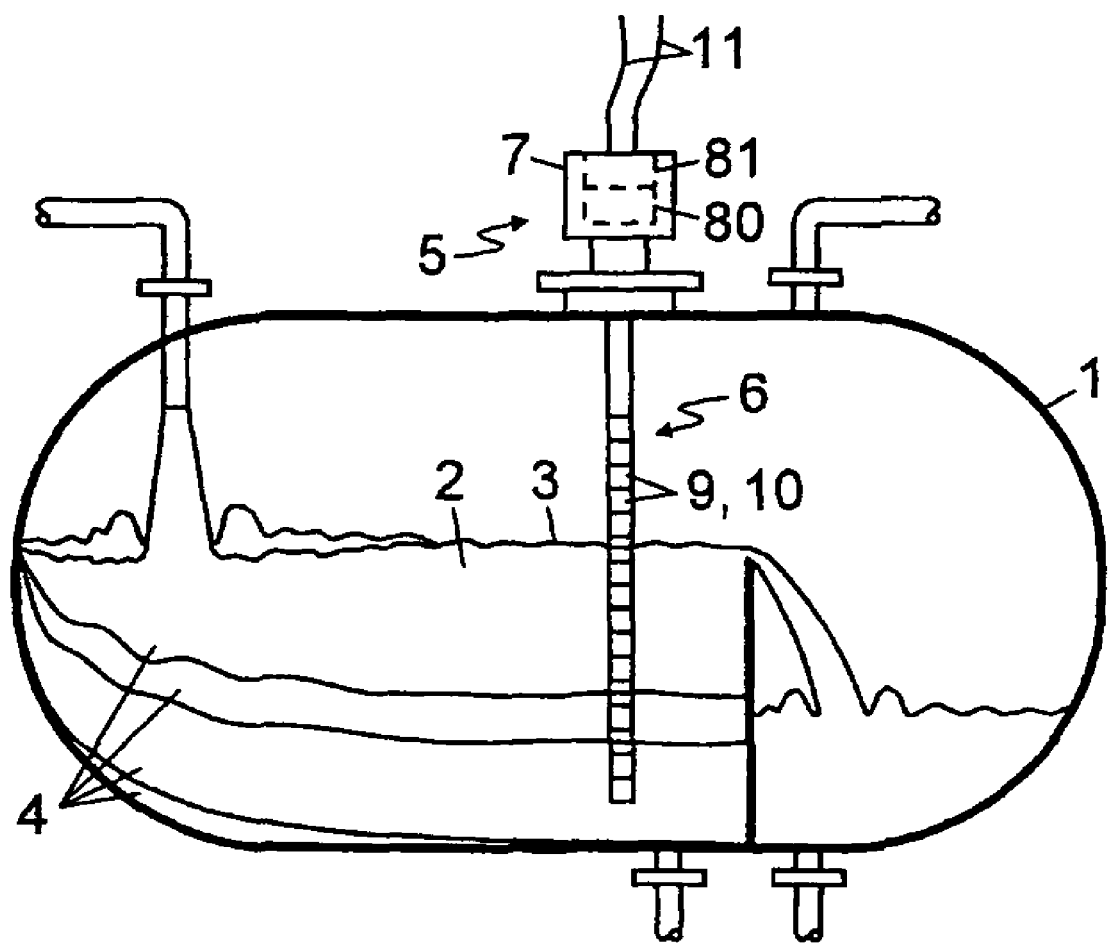
FIG. 1 shows an embodiment of a level transmitter with a multi-sensor probe in an installed state.

FIG. 1 shows an oil/water separation tank 1 with inflow of waste water as a measuring medium 2. In the tank 1, the different components of the waste water 2 as well as gases above the waste water level 3 form different layers 4, such as from bottom up sand, water, emulsion, oil, foam, and air, with different dielectric constants. A capacitive level transmitter 5 is mounted through the top wall of the tank 1 and comprises a rod-shaped probe 6 dipping into the measuring medium 2 and a head housing 7 positioned outside the tank 1 and containing a measuring circuit 80 and a transmitter controller 81. The probe 6 is longitudinally segmented into a plurality of segments 9, each segment 9 comprising a sensor 10 in the form of a preferably annular electrode. Each sensor electrode 10 forms an electrical capacitor to a common ground electrode, which can be the wall of the tank 1, a separate electrode outside or inside the tank 1, or can be formed by those of the sensor electrodes 10 which, at the moment, are not used for the measurement. The electrodes 10 can be inserted into a pipe to protect them from mechanical damage and from the surrounding medium 2.

The capacities between the sensor electrodes 10 and the common ground electrode are successively and separately measured by the measuring circuit 80, thus obtaining a plurality of measuring signals in dependence on the capacities of the individual capacitors. These measuring signals are further processed by the transmitter controller 81 which operates under a control program stored in a read-only memory, utilizing parameters stored in a non-volatile random access memory, and provided with a working memory in the form of random access memory. The transmitter controller 81 executes an algorithm to determine the layers 4 and the positions of the interfaces between them. The thus obtained measuring results are displayed on site and/or are transmitted over a field bus or two-wire cable 11 to a process automation system from which the transmitter controller 81 further receives commands and parameters.

The number of medium layers 4 is not known a priori. The algorithm performed by the transmitter controller 81 must therefore jointly detect the number of layers 4 and positions of the interfaces therebetween from the measured capacities of the individual capacitors, where each capacity is more or less affected by the dielectric parameters of all layers 4. The algorithm must also estimate the dielectric parameters of the various layers 4.

For a more in-depth understanding of the following description, reference is made to the above cited publications of C. Andrieu, A. Doucet, W. Ng, J. P. Reilly, T. Kirubarajan and J. R. Larocque.

Figure 2:
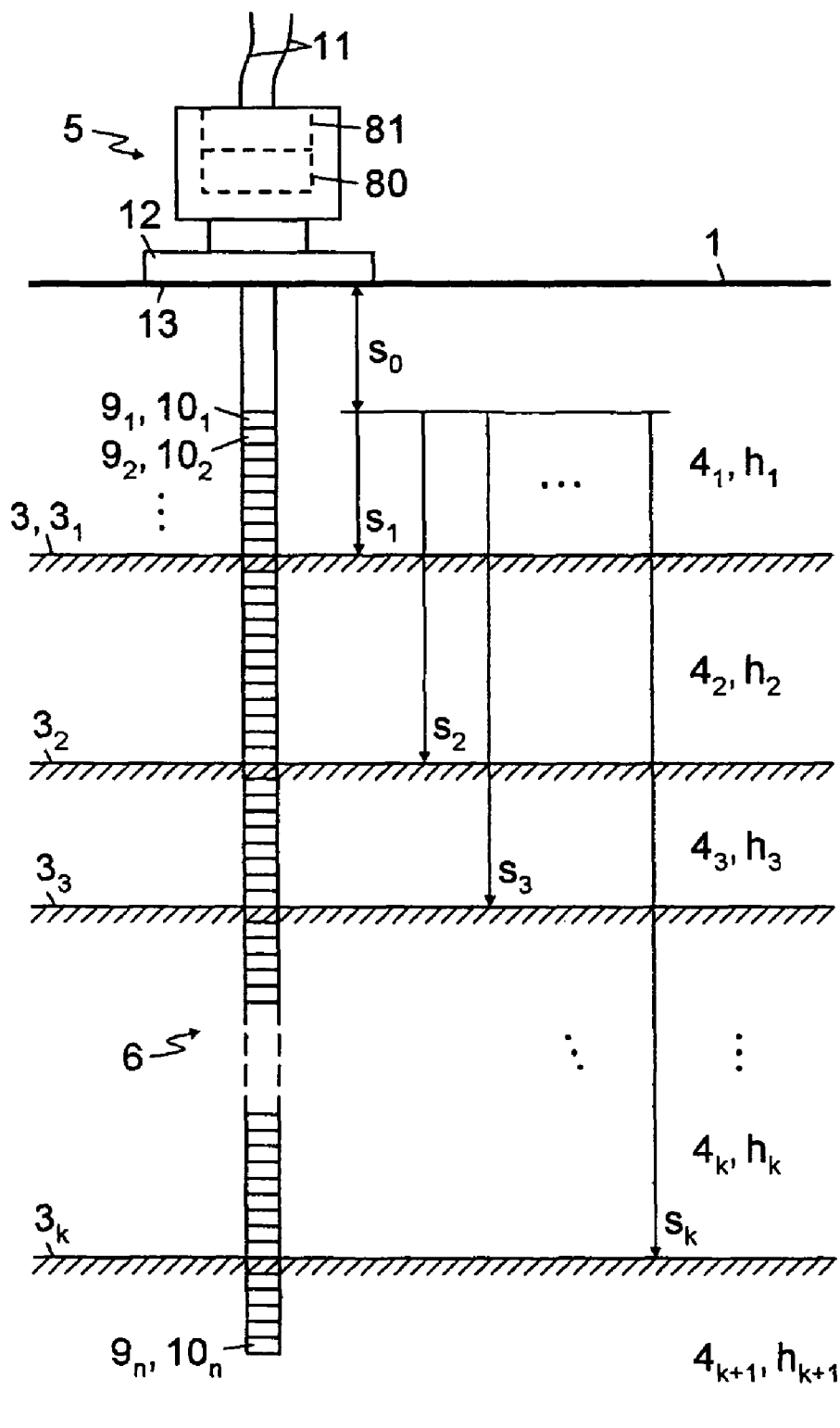
FIG. 2 shows the level transmitter in relation to a series of superimposed medium layers.

FIG. 2 shows in a simplified manner the level transmitter 5 in relation to a series of superimposed medium layers $4_1$, $4_2, \ldots, 4_{k+1}$. The level transmitter 5 comprises a mounting flange 12 which defines a reference level 13. The measuring zone of the probe 6 begins with the top most segment $9_1$ or electrode $10_1$ at a predetermined distance $s_0$ from said reference level 13 and extends to the distal end of the probe 6 with segment $9_n$ or electrode $10_n$, where n>>k. The position of the interface $3_1$ between the uppermost layer $4_1$ (air) and the subjacent layer $4_2$, i.e. the waste water level 3, is given by a vector $s_1$ plus the known offset distance $s_0$, wherein the size of the vector $s_1$ equals the number of the segments 9 or electrodes 10 of the probe 6 from the top to the interface $3_1$. The position of the subjacent interface $3_2$ between the layers $4_2$ and $4_3$ is given by a vector $s_2$ plus the known offset distance $s_0$, wherein the size of the vector $s_2$ equals the number of the segments 9 or electrodes 10 of the probe 6 from the top to the interface $3_2$. The same applies, correspondingly, to the other interfaces $3_3$ to $3_k$.

A matrix M can now be defined as a function of the interface vectors $s_1, s_2, \ldots, s_k$:

where ones(a,b) and zeros(a,b) are a-by-b matrices of ones and zeros, respectively, so that, for example, ones($s_2-s_1$,1) is a column vector of $|s_2-s_1|$ ones and defines the thickness of medium layer $4_2$ in terms of the number of segments 9 or electrodes 10 within this layer $4_2$.

Then, the measurement of the level transmitter 5 at the nth of 1, . . . , N observations can be modeled as:

$$y(n)=M(s(n)) \cdot h(n)+w(n) \qquad \text{(Eq. 2)},$$

where $h=(h_1, h_2, \ldots, h_k)^T$ is a vector composed of the dielectric indices of the layers $4_1, 4_2, \ldots, 4_k$, and w represents the measurement noise which can be modeled as additive white Gaussian noise (AWGN) with unknown variance $\sigma_w^2$. The components of the measuring vector y are the measurements from each individual segment 9 or electrode 10.

The prior distributions of the parameters $s_1, s_2, \ldots, s_k$ and k are chosen to be non-informative as to not bias the optimization, but also in function of their analytical tractability.

According to Bayes' Theorem the prior probability distribution of the interface vectors $s_1, s_2, \ldots, s_k$, i.e. the joint probability of k interfaces $3_1, 3_2, \ldots, 3_k$ with the interface vectors $s_1, s_2, \ldots, s_k$ is given by:

$$p(s_1, s_2, s_3, \ldots, s_k)=p(s_1) \cdot p(s_2|s_1) \cdot p(s_3|s_1, s_2) \cdot \ldots \cdot p(s_k|s_1, s_2, \ldots, s_{k-1}) \qquad \text{(Eq. 3)},$$

where p(a|b,c) is the conditional probability of a, given b and c. As the interfaces $3_1, 3_2, \ldots, 3_{i-1}$ always exist if interface $3_i$ exists, i.e. as $p(s_{i-1}|s_i)=1$ and $p(s_1, s_2, \ldots, s_{i-1}|s_i)=1$, the joint probability $p(s_1, s_2, \ldots, s_k)$ can be rewritten as:

$$p(s_1, s_2, s_3, \ldots, s_k)=p(s_1) \cdot p(s_2|s_1) \cdot p(s_3|s_2) \cdot \ldots \cdot p(s_k|s_{k-1}) \qquad \text{(Eq. 4)},$$

where the conditional probabilities $p(s_i|s_{i-1})$ can be expressed by a Poisson distribution:

$$p(s_i \mid s_{i-1}) = \lambda^{(s_i - s_{i-1})} \frac{e^{-\lambda}}{(s_i - s_{i-1})!} \propto \frac{\lambda^{(s_i - s_{i-1})}}{(s_i - s_{i-1})!}, \qquad \text{(Eq. 5)}$$

with hyperparameter $\lambda$ defined as the average thickness of the layers 4. The Poisson distribution $p(s_i|s_{i-1})$ describes the probability of the occurrence of certain thicknesses $s_i-s_{i-1}$ of the layer $4_i$ in dependence on the average thickness $\lambda$ of the layers 4.

The prior distribution of the dielectric indices $h=(h_1, h_2, \ldots, h_k)^T$ is chosen as a normal distribution:

$$p(h|s_1, s_2, \ldots, s_k, k, \sigma_w^2)=N(m, \Sigma_h)=N(0, \sigma_w^2 I_h)=N(0, \sigma_w^2 d^2 [M^H M]^{-1}) \qquad \text{(Eq. 6)},$$

with mean m=0, covariance matrix $I_h$ and where the superscript H denotes the Hermitian transpose operation. The hyperparameter $d^2$ is defined as an a priori estimate of the signal-to-noise ratio of the measurement.

The unknown number k of the medium layers 4 is modeled by a Poisson distribution:

$$M(s) = \begin{bmatrix} \text{ones}(s_1 - 1, 1) & \text{zeros}(s_1 - 1, 1) & \text{zeros}(s_1 - 1, 1) & \ldots & \text{zeros}(s_1 - 1, 1) \\ \text{zeros}(s_2 - s_1, 1) & \text{ones}(s_2 - s_1, 1) & \text{zeros}(s_2 - s_1, 1) & \ldots & \text{zeros}(s_2 - s_1, 1) \\ \text{zeros}(s_3 - s_2, 1) & \text{zeros}(s_3 - s_2, 1) & \text{ones}(s_3 - s_2, 1) & \ldots & \text{zeros}(s_3 - s_2, 1) \\ \vdots & \vdots & \vdots & \ddots & \vdots \\ \text{zeros}(s_k - s_{k-1}, 1) & \text{zeros}(s_k - s_{k-1}, 1) & \text{zeros}(s_k - s_{k-1}, 1) & \ldots & \text{ones}(s_k - s_{k-1}, 1) \end{bmatrix}, \qquad \text{(Eq. 1)}$$

$$p(k) = \Lambda^k \frac{e^{-\lambda}}{k!} \propto \frac{\Lambda^k}{k!}, \qquad (Eq. 7)$$

with hyperparameter $\Lambda$ defined as the expected or average number of layers 4.

The prior distribution of the variance $\sigma_w^2$ of the measurement noise w is assumed to follow the inverse gamma distribution, which is the conjugate distribution for the normal distribution as follows:

$$p(\sigma_w^2) = IG(\alpha_0, \gamma_0) \qquad (Eq. 8),$$

where $\alpha_0$ and $\gamma_0$ are hyperparameters.

Using Bayes' Theorem and, derived therefrom, the relationship $p(a,b|c) = [p(c|a,b) \cdot p(a|b) \cdot p(b)]/p(c)$, the joint posterior distribution of the unknown parameters $s_1, s_2, \ldots, s_k$ and k can be defined as:

$$\begin{aligned}
p(s_1, s_2, \ldots, s_k, h, k, \sigma_w^2 \mid y) &\propto \qquad (Eq. 9)\\
p(y \mid s_1, s_2, \ldots, s_k, h, k, \sigma_w^2) &\cdot p(s_1, s_2, \ldots, s_k, h, k, \sigma_w^2) \propto\\
p(y \mid s_1, s_2, \ldots, s_k, h, k, \sigma_w^2) &\cdot\\
p(h \mid s_1, s_2, \ldots, s_k, k, \sigma_w^2) &\cdot p(s_1, s_2, \ldots, s_k, k, \sigma_w^2) \propto\\
p(y \mid s_1, s_2, \ldots, s_k, h, k, \sigma_w^2) &\cdot p(h \mid s_1, s_2, \ldots, s_k, k, \sigma_w^2) \cdot\\
p(s_1, s_2, \ldots, s_k \mid k, \sigma_w^2) &\cdot p(k, \sigma_w^2) \propto\\
p(y \mid s_1, s_2, \ldots, s_k, h, k, \sigma_w^2) &\cdot p(h \mid s_1, s_2, \ldots, s_k, k, \sigma_w^2) \cdot\\
p(s_1, s_2, \ldots, s_k \mid k, \sigma_w^2) &\cdot p(k \mid \sigma_w^2) \cdot p(\sigma_w^2),
\end{aligned}$$

where $p(y|s_1, s_2, \ldots, s_k, k)$ is the likelihood term and the remaining terms define the above described individual prior distributions of the parameters $s_1$ to $s_k$ h, k and $\sigma_w^2$.

Considering h and $\sigma_w^2$ to be nuisance parameters, the Bayesian model allows analytically integrating out these nuisance parameters. With $P_{not}$ defined as a projector on the complementary space spanned by the vector $s = (s_1, s_2, \ldots, s_k)^T$ and by using the above Equations 1 to 9, the a posterior distribution of the unknown parameters $s_1, s_2, \ldots, s_k$ and k can be defined as:

$$p(s_1, s_2, \ldots, s_k, k \mid y) \propto \qquad (Eq. 10)$$

$$\frac{\left(\sum_{n=1}^{N} y_n^H P_{not} y_n\right)^{-NL/2}}{(1+d^2)^{kN/2}} \cdot \prod_{i=1}^{k} \frac{\lambda^{(s_i - s_{i-1})}}{(s_i - s_{i-1})!} \cdot \frac{\Lambda^k}{k!}.$$

The estimate $\hat{s}$ of $(s_1, s_2, \ldots, s_k)$ is defined as its value for which the posterior distribution $p(s_1, s_2, \ldots, s_k, k|y)$ attains its maximum value:

$$\hat{s} = \underset{s_1, s_2, \ldots, s_k}{\arg\max}\, p(s_1, s_2, \ldots, s_k, k \mid y_n). \qquad (Eq. 11)$$

Once the interfaces 3 of the medium layers 4 have been identified by Equation 11, the estimate $\hat{h}$ of the dielectric constants $(h_1, h_2, \ldots, h_k)$ can be readily calculated as the least-square solution of Equation 2:

$$\hat{h} = (M^H(\hat{s}) M(\hat{s}))^{-1} M^H(\hat{s}) y_n \left(\frac{d^2}{1+d^2}\right). \qquad (Eq. 12)$$

The posterior distribution $p(s_1, s_2, \ldots, s_k, k|y)$ is highly nonlinear in its parameters $s_1, s_2, \ldots, s_k$ and k, thus precluding analytical calculations. Since the number k of medium layers 4 or interfaces 3 to be estimated not known a priori but assumed random, the posterior distribution to be evaluated is defined on a finite disconnected union of subspaces of various dimensions. Each subspace corresponds to a model with a fixed number of medium layers 4. The main problem of the Bayesian approach is that it requires the evaluation of high-dimensional integrals that do not admit any closed-form analytical expression. It is therefore necessary to numerically approximate these integrals. To evaluate the joint distribution of the number of layers 4 and their parameters, a stochastic algorithm based on Markov Chain Monte Carlo (MCMC) methods is used.

The concept behind MCMC optimization algorithms is to observe and collect samples that are distributed according to the posterior distribution $p(s_1, s_2, \ldots, s_k, k|y)$. With those samples, a histogram can be calculated, and the optimization is reduced to the search of the maximum of the histogram.

The challenge is then shifted from optimizing a difficult cost function to finding a way to generate samples distributed according to a complex, non-linear, and multi-dimensional probability density function. This is where Markov Chains become useful.

Markov Chains can model the behavior of a system that depends only on the previous experiment or state. That is, the next state of the system depends only on the current state where the state can change to another state with some probability, or remain the same with some other probability. The outcome of each experiment is one of a discrete set of states.

Figure 3:
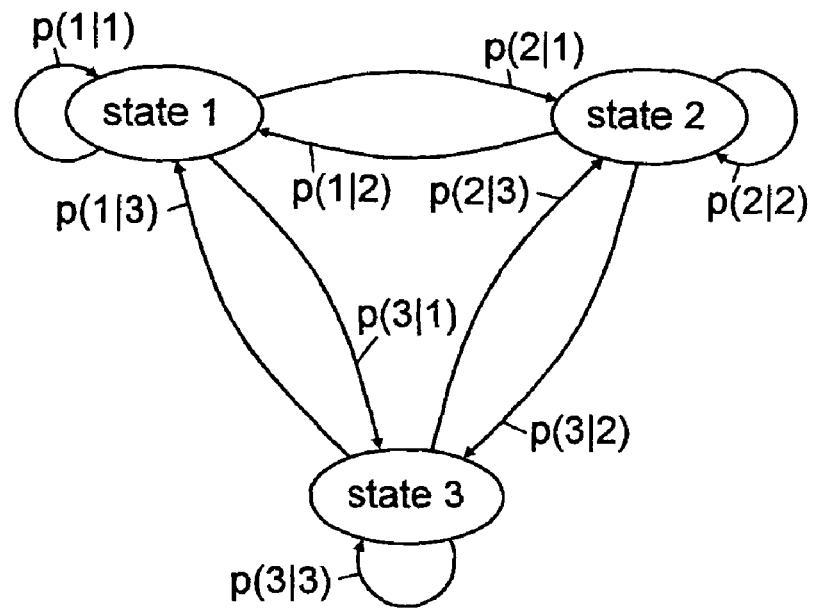
FIG. 3 gives a simple example of a Markov Chain.

FIG. 3 shows a simple 3-state Markov Chain, where p(j|i) equals the probability of going from state i to state j. A useful characteristic of Markov Chains is the limiting distribution which designates the probability p(j) of being in a given state j and is a function of only the various probabilities of movement p(j|i).

Now, setting the posterior distribution $p(s_1, s_2, \ldots, s_k, k|y)$ as being the desired limiting distribution, the various probabilities of movement have to be defined that will give the limiting distribution of interest. Once this achieved, simply observing the states of the Markov Chain can generate the samples, which will be by design distributed according to the posterior distribution $p(s_1, s_2, \ldots, s_k, k|y)$.

There exist a few methods to set up the desired Markov Chain such as accept/reject proposal, and a few variations of the Metropolis-Hasting algorithms. The Reversible Jump MCMC is a form of Metropolis-Hasting algorithm in which the samples come from an "easy-to-observe" distribution and are kept or rejected based on some probability. The ones that are kept are by design distributed according to the distribution of interest, namely the posterior distribution $p(s_1, s_2, \ldots, s_k, k|y)$ to optimize.

The algorithm starts its exploration in a subspace of an arbitrary given initial dimension. The Markov Chain will evolve according to its functions of movement and will converge to the subspace of optimum dimension and to the optimum estimate of the medium layers 4 or interfaces 3.

For each iteration of the algorithm, the Markov Chain evolves by proposing a candidate for the new position. This candidate is accepted as next position (state) of the chain with some probability. Furthermore, the candidate for the new position may come from a subspace of higher dimension (attempting to estimate an additional medium layer 4), or from a subspace of lower dimension (attempting to remove a layer 4). This gives the algorithm the freedom to optimize over not only the position of the layers 4, but also to jointly optimize over the number k of layers 4.

The probability of accepting the new position depends on the posterior function to optimize and the proposal functions that generated the candidate. This is the difference with an exhaustive search algorithm: even though the candidate would give a better solution to the function, it is not necessarily accepted, as the acceptance is probabilistic. This particularity of such MCMC methods allows the optimization to converge to the global optimum with probability one.

Initial Estimate:
k=2 (i.e. two medium layers $4_1$, $4_2$, one interface $3_1$) and interface vector s=$s_1$=(probe length)/2.
Iterations:
Choose a Move at Random Among:
Update move in the same subspace of size k:
  Propose a candidate $s_1$*=random over the probe or
  propose a candidate $s_1$*around the current interface vector $s_1$;
Birth move toward the higher subspace of size k*=(k+1):
  Propose a candidate s*=[$s_1$,$s_2$], where $s_2$ is randomly distributed over the probe 6; and
Death move toward the lower subspace of size k*=(k−1):
  Propose a candidate s*=$s_1$−, where $s_1$− sees one element of s removed randomly.
Calculate the acceptance probability of the candidate {k*, s*}
U=uniformly distributed over [0,1]
If U<acceptance probability, the chain takes the size k*, and the state s*, otherwise the chain remains at size k and at state s.

The sizes k and positions s visited are accumulated in a buffer. At the end of the iterations, a histogram of the sizes visited reveals the maximum a posteriori (MAP) estimate of the number of layers. The histogram of the positions visited in that particular subspace reveals the MAP estimate of the position of the layers. It is typical that, at convergence, the chains remains in the same subspace and at the same position, which are thus the MAP estimates of interest.

Figure 4:
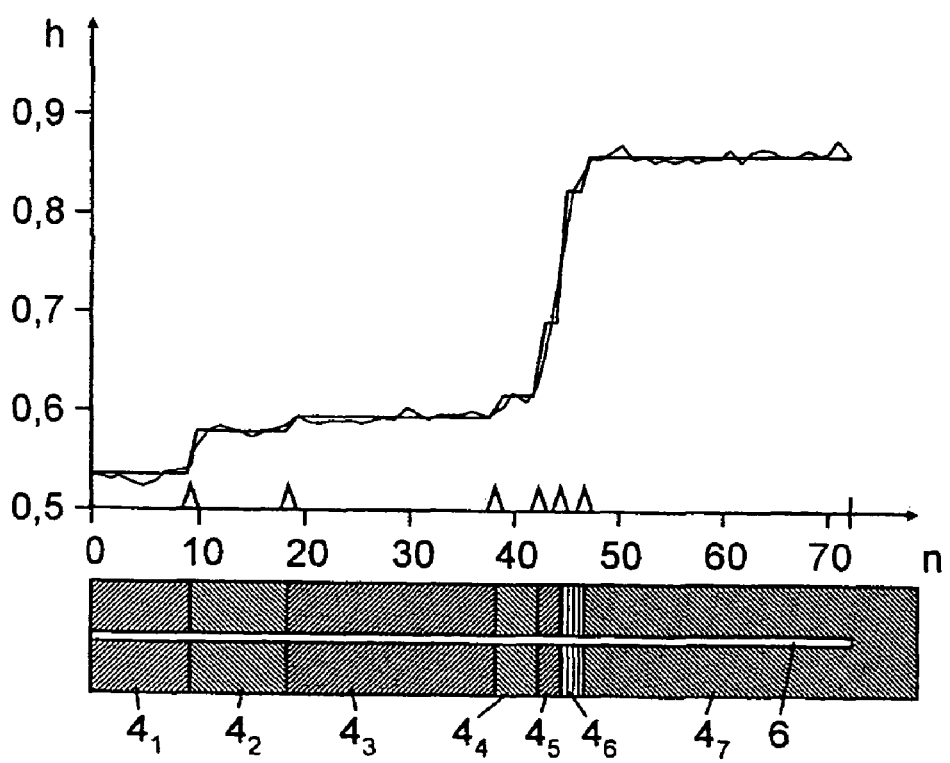
FIG. 4 exemplarily shows the result of the measuring method according to the invention.

FIG. 4 exemplary shows the results of the processing of a typical batch of N=32 snapshots of the probe 6, which comprises n=73 segments 9. The algorithm finds six definite interfaces 3 and seven medium layers 4. The upper part of FIG. 4 shows a typical profile of the dielectric constant h vs. the number n of segments 9. The lower part of FIG. 4 shows the medium layers $4_1$, . . . , $4_7$ along the probe 6.

The invention claimed is:

1. A method for measuring different medium layers of a measuring medium using a multi-sensor probe to be dipped into the measuring medium, comprising:
  providing the probe which is longitudinally segmented into a plurality of segments, each segment comprising a sensor for measuring a predetermined physical parameter of the surrounding medium;
  defining a measurement model, said model modeling signals of the sensors as a function of positions of a number of interfaces between the medium layers and the physical parameters of the medium layers;
  defining prior distributions of the number of the interfaces, the positions of the interfaces and the physical parameters of the medium layers;
  based on the measurement model and the prior distributions determining a joint posterior distribution of the number of the interfaces and the positions of the interfaces; and
  evaluating a joint posterior distribution of the number of the interfaces and the positions of the interfaces based on Markov Chain Monte Carlo methods.

2. An apparatus for measuring different medium layers of a measuring medium, comprising:
  a multi-sensor probe to be dipped into the measuring medium and longitudinally segmented into a plurality of segments, each segment comprising a sensor for measuring a predetermined physical parameter of the surrounding medium;
  a measuring circuit for generating a plurality of measuring signals in dependence on the physical parameters measured by the individual sensors; and
  a controller for determining the layers and the positions of the interfaces between them by evaluating the measuring signals, wherein the controller has:
    a measurement model modeling signals of the sensors as a function of positions of a number of interfaces between the medium layers and the physical parameters of the medium layers,
    prior distributions of the number of the interfaces, the positions of the interfaces and the physical parameters of the medium layers, wherein
    the controller determines a joint posterior distribution of the number of the interfaces and the positions of the interfaces the based on the measurement model and the prior distributions, and evaluates the joint posterior distribution of the number of the interfaces and the positions of the interfaces based on Markov Chain Monte Carlo methods.

3. The apparatus of claim 2, wherein the sensors comprises sensor electrodes to form electrical capacitors to a common ground electrode, and wherein the predetermined physical parameters are the dielectric constants of the medium layers.

4. The apparatus of claim 3, wherein the sensor electrodes and the measuring circuit are adapted to successively and separately measure the dielectric constants between the sensor electrodes and the common ground electrode, and wherein the common ground electrode is formed by at least one of those of the sensor electrodes which, at the moment, are not used for the measurement.

5. The apparatus of claim 2, wherein the sensor electrodes and the measuring circuit are adapted to successively and separately measure the dielectric constants between the sensor electrodes and the common ground electrode, and wherein the common ground electrode is formed by at least one of those of the sensor electrodes which, at the moment, are not used for the measurement.

* * * * *